(12) United States Patent
Holzapfel et al.

(10) Patent No.: US 7,154,609 B2
(45) Date of Patent: Dec. 26, 2006

(54) INTERFERENTIAL POSITION MEASURING ARRANGEMENT

(75) Inventors: Wolfgang Holzapfel, Obing (DE); Michael Hermann, Tacherting (DE); Walter Huber, Traunstein (DE); Völker Hofer, Traunreut (DE); Ulrich Benner, Trostberg (DE); Karsten Sändig, Palling (DE)

(73) Assignee: Johannes Heidenhain GmbH, Traunreut (DE)

( * ) Notice: Subject to any disclaimer, the term of this patent is extended or adjusted under 35 U.S.C. 154(b) by 116 days.

(21) Appl. No.: 10/635,422

(22) Filed: Aug. 6, 2003

(65) Prior Publication Data
US 2004/0090637 A1 May 13, 2004

(30) Foreign Application Priority Data
Aug. 7, 2002 (DE) .............................. 102 36 230

(51) Int. Cl.
*G01B 9/02* (2006.01)
(52) U.S. Cl. .............. 356/499; 250/237 G; 250/231.14; 356/618
(58) Field of Classification Search ................ 356/508, 356/499, 521, 616, 618, 488, 494; 250/237 G, 250/231.13
See application file for complete search history.

(56) References Cited

U.S. PATENT DOCUMENTS

| 4,079,252 A | * | 3/1978 | Brake ..................... 250/237 G |
| 5,079,418 A | | 1/1992 | Michel et al. |
| 5,430,546 A | * | 7/1995 | Huber ....................... 356/499 |
| 5,493,399 A | * | 2/1996 | Meyer et al. ............... 356/619 |
| 5,530,543 A | * | 6/1996 | Hercher ..................... 356/499 |
| 5,574,558 A | | 11/1996 | Kudo et al. |
| 5,689,336 A | * | 11/1997 | Huber ....................... 356/499 |
| 5,696,584 A | * | 12/1997 | Franz et al. ................ 356/521 |
| 5,760,959 A | * | 6/1998 | Michel et al. .............. 359/566 |

(Continued)

FOREIGN PATENT DOCUMENTS

DE 197 01 941 A1 7/1997

(Continued)

OTHER PUBLICATIONS

Jörg Willhelm, "Dreigitterschrittgeber," Dissertation made at Hannover Technical University, 1978, pp. 47-52.

*Primary Examiner*—HWA (Andrew) Lee
*Assistant Examiner*—Denise B Anderson
(74) *Attorney, Agent, or Firm*—Brinks Hofer Gilson & Lione

(57) ABSTRACT

An interferential position measuring arrangement including a light source, which emits a beam of rays and an optical element, which converts the beam of rays emitted by the light source into an incoming beam of rays. A scale grating which splits the incoming beam of rays into a first partial beam of rays and a second partial beam of rays. A first scanning grating that causes splitting of the first partial beam of rays and a second scanning grating that causes splitting of the second partial beam of rays, wherein a periodically modulated interferential fringe pattern with definite spatial interferential fringe pattern period results in a detection plane. A detection arrangement which causes splitting of light entering through the detection arrangement into at least three different spatial directions and optoelectronic detector elements arranged in the at least three spatial directions for detecting phase-shifted scanning signal.

32 Claims, 6 Drawing Sheets

U.S. PATENT DOCUMENTS

| | | |
|---|---|---|
| 5,774,219 A | 6/1998 | Matsuura |
| 5,812,320 A | 9/1998 | Maeda |
| 5,814,812 A * | 9/1998 | Holzapfel .............. 250/231.16 |
| 5,994,692 A * | 11/1999 | Holzapfel ............... 250/237 G |
| 6,005,667 A * | 12/1999 | Takamiya et al. ........... 356/499 |
| 6,151,128 A * | 11/2000 | Huber ....................... 356/499 |
| 6,885,457 B1 * | 4/2005 | Michel et al. .............. 356/499 |
| 6,907,372 B1 | 6/2005 | Spanner |

FOREIGN PATENT DOCUMENTS

| | | |
|---|---|---|
| EP | 0 446 691 A2 | 9/1991 |
| EP | 0 446 691 B1 | 7/1995 |
| EP | 1 085 291 A2 | 3/2001 |

* cited by examiner

INTERFERENTIAL POSITION MEASURING ARRANGEMENT

Applicants claim, under 35 U.S.C. §119, the benefit of priority of the filing date of Aug. 7, 2002 of a German patent application, copy attached, Serial Number 102 36 230.0, filed on the aforementioned date, the entire contents of which is incorporated herein by reference.

BACKGROUND OF THE INVENTION

1. Field of the Invention

The present invention relates to an interferential position measuring arrangement for determining the relative positions of two objects which are movable with respect to each other at least in the measuring direction, and which includes a light source, an optical element arranged downstream of the light source, a scale grating arranged downstream of the light source, respective scanning gratings, a detection arrangement, and optoelectronic detector elements arranged in at least three spatial directions.

2. Discussion of Related Art

Interferential position measuring arrangements for a precise position determination, which utilize diffraction effects at gratings for generating high-resolution, position-dependent scanning signals, are known. Phase shifts which are proportional to the path change result in the partial beams with deflected orders of diffraction in the course of a movement of a scale grating in relation to a scanning unit. For evaluating, or detecting, the respective phase shifts, the various split partial light beams, or orders of diffractions, are superimposed and caused to interfere. In the case of a movement a periodic modulation of the interference strip pattern results, which is detected by a suitable optoelectronic detector arrangement. In connection with such interferential position measuring arrangements reference is made, for example, to Chapter 4, pages 47 to 52 of a dissertation of J. Willhelm, entitled "Dreigitterschrittgeber" [Three-grating Incremental Generator], 1978.

A further variation of interferential position measuring arrangements is known from FIG. 13 in U.S. Pat. No. 6,005,667, the entire contents of which are incorporated herein by reference. Following the formation of a beam by a lens, a beam of rays emitted by a light source impinges on a scale grating arranged in the area of the beam waist. The impinging beam of rays is split by the scale grating into +/− orders of diffraction, or into corresponding partial beams of rays, which spread out away from the optical axis. Thereafter, the partial beams of rays reach further diffracting scanning gratings, which deflect the impinging partial beams of rays back in the direction of the optical axis. A detection arrangement, which has four phase-shifted partial areas for generating four scanning signals, each phase-shifted by 90°, is arranged in a detection plane in which the partial beams of rays are brought to interference.

In addition, reference is made here to U.S. Pat. No. 5,574,558, the entire contents of which are incorporated herein by reference, which discloses a further interferential position measuring arrangement.

In connection with such high-resolution position measuring arrangements, the demands made on the mounting tolerances have been shown to be particularly critical. This means that as a rule the mounting tolerances are very narrow, which causes a large outlay for assembly and adjustment in turn. Added to this are demands for an arrangement of the smallest possible dimensions, in particular a scanning unit of the smallest possible dimensions, and the greatest immunity to soiling or contamination. Basically, in connection with such position measuring arrangements the best possible quality of the resulting scanning signals is important, especially if further electronic processing, for example an interpolation of the signals, is provided. However, none of the interferential position measuring devices in the publications cited meets all mentioned requirements in a satisfactory way.

Thus, the arrangement known from U.S. Pat. No. 6,005,667 continues to be susceptible to soiling of the scale grating, in spite of a defined immunity regarding misalignments of the scale grating and the scanning unit.

It should be mentioned that the known device in U.S. Pat. No. 5,574,558 is very sensitive to fluctuations of the distance between the two gratings which can be moved in relation to each other, i.e. only small mounting tolerances exist in this direction. This is caused by the divergent, or non-collimated illuminating beam of rays impinging on the first grating.

OBJECT AND SUMMARY OF THE INVENTION

It is therefore an object of the present invention to create a high-resolution interferential position measuring arrangement having large mounting tolerance, which is as immune as possible to soiling or contamination and allows a compact construction.

This object is attained by an interferential position measuring arrangement for determining the relative positions of a first object and a second object which are movable with respect to each other at least in a measuring direction. The interferential position measuring arrangement including a light source connected to a first object, which emits a beam of rays in a direction of an optical axis and an optical element arranged downstream of the light source, which converts the beam of rays emitted by the light source into an incoming beam of rays. A scale grating connected to a second object that moves relative to the first object and arranged downstream of the light source, which splits the incoming beam of rays at least into a first partial beam of rays, which is propagated into a first spatial direction and a second partial beam of rays, which is propagated into a second spatial direction that is different from the first spatial direction. A first scanning grating that is arranged in a beam path of the first partial beam of rays and causes splitting of the first partial beam of rays into third and fourth partial beams of rays and a second scanning grating that is arranged in a beam path of the second partial beam of rays and causes splitting of the second partial beam of rays into fifth and sixth partial beams of rays, wherein at least two of the third, fourth, fifth and sixth partial beams of rays meet again, and wherein in the case of relative movement between the scale grating and the light source, a periodically modulated interferential fringe pattern with a definite spatial interferential fringe pattern period results in a detection plane. A detection arrangement arranged in the detection plane, which causes splitting of light entering through the detection arrangement into at least three different spatial directions and optoelectronic detector elements arranged in the at least three spatial directions for detecting phase-shifted scanning signals.

This object is furthermore attained by an interferential position measuring arrangement for determining the relative positions of a first object and a second object which are movable with respect to each other at least in a measuring direction. The interferential position measuring arrangement including a light source connected to a first object, which emits a beam of rays in a direction of an optical axis and an optical element arranged downstream of the light source, which converts the beam of rays emitted by the light source into an incoming beam of rays. A scale grating connected to a second object that moves relative to the first object and arranged downstream of the light source, which splits the incoming beam of rays at least into a first partial beam of rays, which is propagated into a first spatial direction and a second partial beam of rays, which is propagated into a second spatial direction that is different from the first spatial direction. A first scanning grating that is arranged in a beam path of the first partial beam of rays and causes splitting of the first partial beam of rays into third and fourth partial beams of rays and a second scanning grating that is arranged in a beam path of the second partial beam of rays and causes splitting of the second partial beam of rays into fifth and sixth partial beams of rays, wherein at least two of the third, fourth, fifth and sixth partial beams of rays meet again, and wherein in the case of relative movement between the scale grating and the light source, a periodically modulated interferential fringe pattern with a definite spatial interferential fringe pattern period results in a detection plane. A detection arrangement arranged in the detection plane for detection of phase-shifted scanning signals, the detection arrangement including a plurality of individual detector elements, wherein a detection period of the individual detector elements is matched to the spatial interferential fringe pattern period.

It should be initially mentioned as an advantage of the attainments of the above object by the present invention that large mounting tolerances regarding the position of the graduated disk with the scale grating result, in particular in the case of an embodiment in the form of a rotary position measuring arrangement. Large mounting tolerances exist in the radial, or tangential direction, as well as in the axial direction. By this the outlay for mounting the position measuring arrangement can be clearly reduced.

Furthermore, the scanning signals generated by the interferential position measuring arrangements have a relatively small proportion of undesirable harmonic waves, i.e. scanning signals of good quality exist. It is therefore possible to minimize measurement errors during the further electronic processing.

It should furthermore be mentioned that it is possible to realize compactly constructed total systems on the basis of the considerations in accordance with the invention, which can also be employed in case of restricted installation conditions.

The requirements with respect to immunity to soiling or contamination have also been met because of the realized so-called one-field scanning. This means that in case of a possible soiling or contamination of the scale grating all generated phase-shifted scanning signals are always evenly affected, and therefore no large errors occur during further signal processing.

The interferential position measuring arrangements in accordance with the present invention can of course be embodied as rotary, as well as linear position measuring arrangements. Besides transmitted light systems, it is furthermore possible to realize incident light systems on the basis of the inventive considerations.

Further advantages, as well as details of the present invention ensue, from the subsequent description of exemplary embodiments by the attached drawings.

DETAILED DESCRIPTION OF THE PREFERRED EMBODIMENTS

Figure 1:
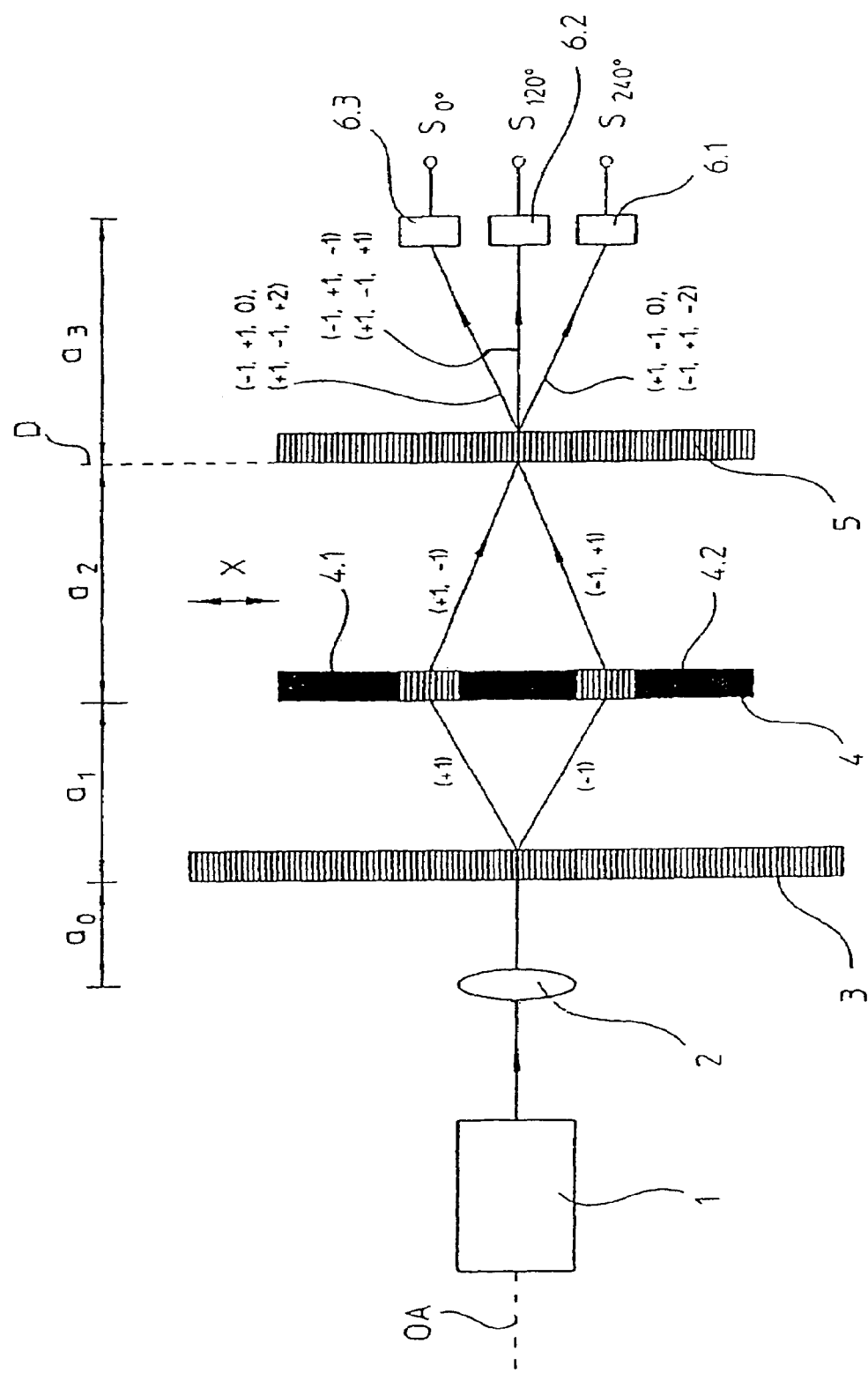
FIG. 1 is a schematic representation of the unfolded emitted beam path of a first embodiment of an interferential position measuring arrangement in accordance with the present invention.
Figure 2:
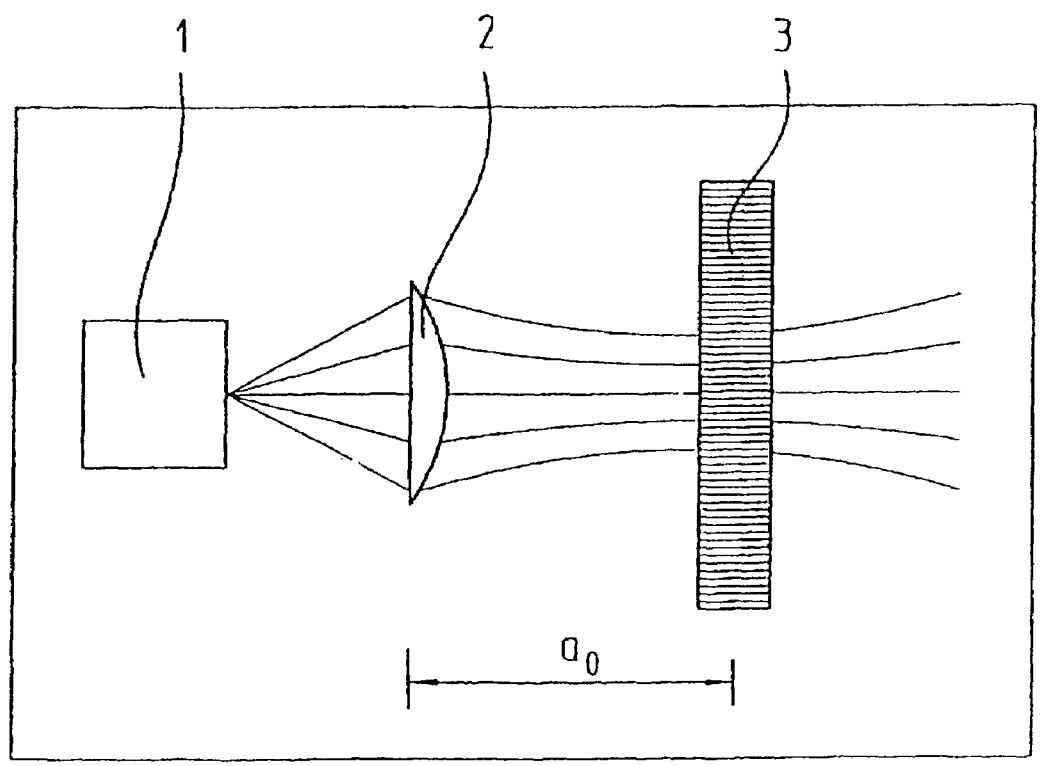
FIG. 2 is a schematic representation of the beam path from the light source to the scale grating of the interferential position measuring arrangement of FIG. 1.
Figure 3:
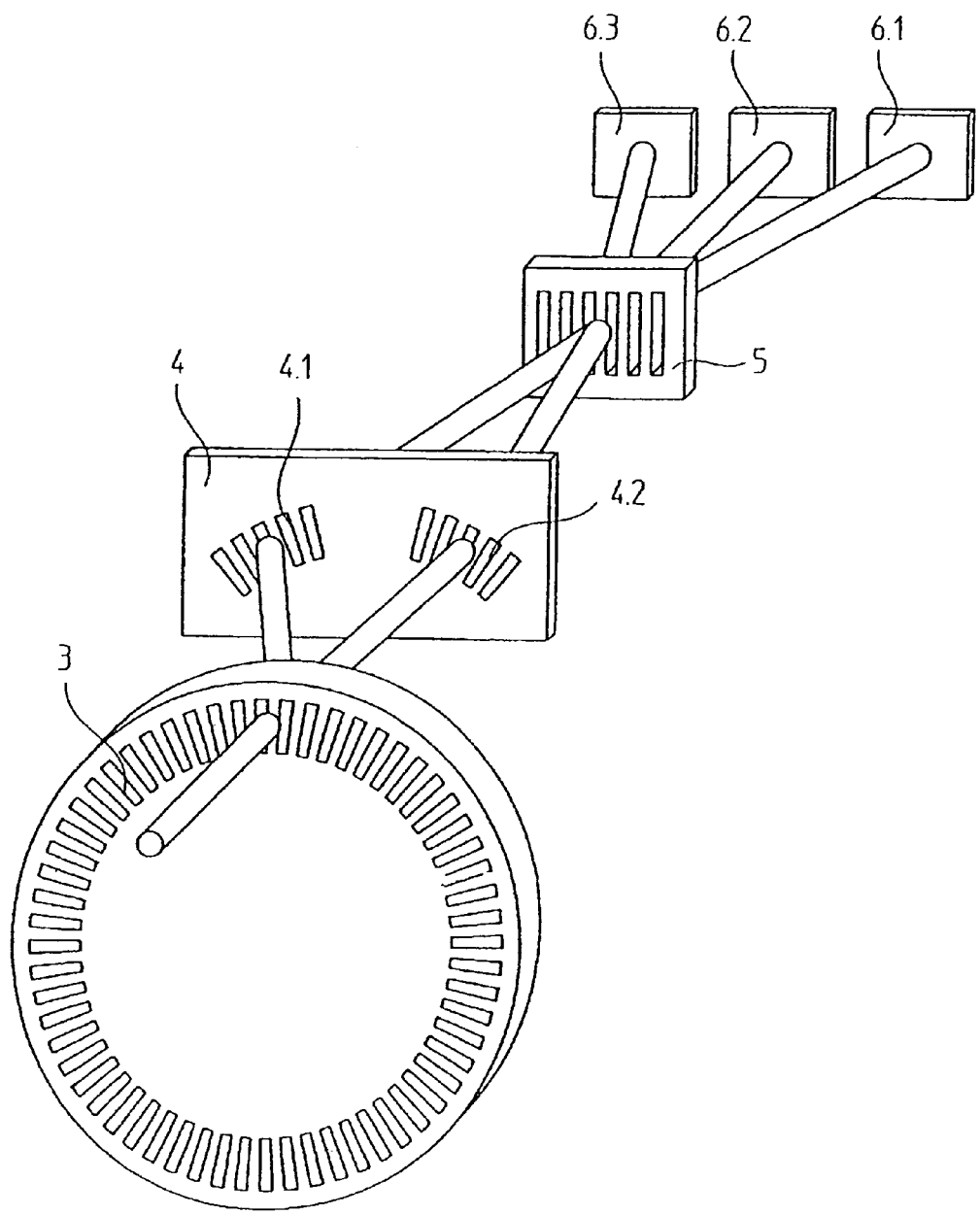
FIG. 3 is a schematic spatial partial representation of the interferential position measuring arrangement of FIG. 1 in accordance with the present invention having an emitted beam path.

A first variation of the position measuring arrangement in accordance with the present invention will be initially explained by FIGS. 1 to 3. Here, FIG. 1 shows the unfolded emitted beam path of the position measuring arrangement in schematic form. The position measuring arrangement is used for the highly precise determination of the relative position of two objects in relation to each other, which can be moved with respect to each other in at least one measuring direction. In the schematic representation of the principle in FIG. 1, a linear displacement in the measuring direction x of the scale grating 3 in relation to the remaining elements 1, 2, 4, 5, 6 arranged in a scanning unit is indicated by the arrow. Accordingly, the scale grating 3 is connected with one of the two objects, and at least a light source 1 and the scanning gratings 4.1, 4.2 of the scanning plate 4 with the other one of the objects. As will become clear from the subsequent explanations, it is of course possible to provide a rotary measuring direction in place of a linear measuring direction, for example if two objects rotate in relation to each other around an axis of rotation, and the angular relative position of the two objects with respect to the axis of rotation is to be determined.

In what follows, the basic path of the emitted beams for generating the displacement-dependent scanning signals will be explained with the aid of FIG. 1.

A beam of rays is emitted by a light source 1, for example embodied as a semiconductor light source in the form of a laser diode, or a so-called VCSEL (vertical cavity surface emitting laser), which spreads along the direction of an optical axis OA. Essentially the emitted beam of rays is preferably a TEM 00 mode of a Gaussian beam emitted by the VCSEL used as the light source 1. Because of the VCSEL emitting characteristics, the beam of rays emitted by the light source 1 has a defined divergence and is converted by an optical element 2 which is placed downstream of the light source 1 in the direction of the propagation of the beams. In the present example a single lens is provided as the optical element 2. Alternatively thereto it would also be possible to consider more complex lens systems, mirror systems, Fresnel lenses, GRIN lenses, etc. for converting the beam.

The beam conversion of the emitted divergent beam of rays preferably takes place in such a way that a nearly collimated beam of rays is present downstream of the optical element 2, and has a beam waist at a defined distance $a_0$ from the optical element 2. In this context, the location in the beam cross section along the direction of the spread of the beam, at which the beam of rays has its minimum surface or transverse extension, is understood to be the beam waist. For explanation, reference is made here to FIG. 2, which shows the shape of the beam of rays prior to and after the beam conversion. As can be seen in FIG. 2, as well as in FIG. 1, a scale grating 3 is arranged in the area of the beam waist at the distance $a_0$ from the optical element 2, on which the converted beam of rays impinges. The arrangement of the scale grating 3 at this location has the advantage that by this the mounting tolerance in the radial or tangential direction, as well as in the direction of the beam spread, i.e. in the axial direction, is increased. For a large mounting tolerance in this direction, an illumination of the scale grating 3 by a beam of rays of little divergence and a narrow beam diameter should be attempted in principle. Since these values cannot be arbitrarily minimized at a fixed wavelength, it is necessary to find a compromise for the optimal arrangement of the scale grating 3. Such a compromise results from the positioning of the scale grating 3 in the beam waist of the emitted, or converted beam of rays, where the product of divergence and beam diameter of the TEM 00 mode of a Gaussian beam is at a minimum.

The scale grating 3 causes a splitting of the incident beam of rays into first and second partial beams of rays (+1), (−1), which spread in different spatial directions, in the present case away from the optical axis OA. In a concrete exemplary embodiment of the position measuring arrangement in accordance with the present invention, the scale grating 3 is embodied as a diffracting phase grating, which means that the first and second partial beams of rays (+1), (−1) correspond to the +/−1st orders of diffraction deflected in the respective spatial directions. In a preferred embodiment, the scale grating 3 embodied as a phase grating has a bar-to-gap ratio $\eta_{MG}=1:1$, as well as a phase depth $\phi_{MG}=180°$.

In the represented example of FIGS. 1 to 3, the scale grating 3 is embodied as a transmitted light grating, however, alternatively it is basically also possible to embody the scale grating 3 as a reflecting incident light grating if the entire system is intended to be operated in incident light.

After splitting at the scale grating 3 has taken place, in the course of the beam propagation each of the first and second partial beams of rays (+1), (−11) then impinges on a scanning grating 4.1, 4.2 arranged in the respective partial beam path. The two scanning gratings 4.1, 4.2 are together arranged on a scanning plate 4. In the area outside of the scanning gratings 4.1, 4.2, the scanning plate 4 is embodied to be opaque, which is intended to be indicated in FIG. 1 by the areas shown in black on the scanning plate 4. It is assured in this way that only the partial beams of rays (+1), (−1), or respectively the +/−1st orders of diffraction, which are propagated away from the scale grating 3, contribute to the generation of signals. In the present case these are exclusively the +/−1st orders of diffraction.

A further splitting of the respective first and second partial beams of rays (+1), (−1) impinging on the scanning gratings 4.1, 4.2 now takes place. The first partial beam of rays (+1) is split by the scanning grating 4.1 into at least a third and fourth partial beam of rays, the second partial beam of rays (−1) is split by the scanning grating 4.2 into at least a fifth and sixth partial beam of rays. Of the at least four resulting split partial beams of rays, at least two partial beams of rays (+1, −1), (−1, +1) again meet, or cross each other, because in the present example they spread toward the optical axis OA again, while the remaining partial beams of rays are propagated in other spatial directions and do not contribute to further signal generation. In the representation in FIG. 1, only the two partial beams of rays (+1, −1), (−1, +1), which meet again and thereafter are used for generating the displacement-dependent scanning signals, are shown after the scanning gratings 4.1, 4.2.

In a preferred embodiment, the scanning gratings 4.1, 4.2 are also embodied as diffracting phase gratings, i.e. the third and fourth, or fifth and sixth partial beams of rays split by the two scanning gratings 4.1, 4.2 correspond to the +/−1st orders of diffraction. Besides the partial beams of rays (+1, −1), (−1, +1) used for signal generation, an indication is provided in FIG. 1 to which orders of diffraction at the various gratings these partial beams of rays correspond.

The phase gratings used as scanning gratings 4.1, 4.2 have a bar-to-gap ratio $\eta_{MG}=1:1$, as well as a phase depth $\phi_{MG}=180°$, furthermore, the respective scanning grating graduation period $TP_{AG}$ has been selected to be less than the scale grating graduation period $TP_{MG}$.

In case of a relative movement between the first object, which is connected with the scale grating 3, for example, and the second object, which is connected with the light source 1 and the scanning gratings 4.1, 4.2, a periodically modulated interferential fringe pattern with a defined spatial interferential fringe pattern period $P_{IF}$ results in a detection plane D from the superimposition of the partial beams of rays (+1, −1) and (−1, +1). The desired displacement-dependent scanning signals can be obtained from the suitable detection of this interferential fringe pattern.

Before the detection of the displacement-dependent scanning signals is finally discussed for explaining the present variation, further advantageous dimensioning rules will be discussed in what follows.

In this connection, a first dimensioning rule for the suitable selection of the distances $a_1$ or $a_2$ needs to be stated. The distance between the scale grating 3 and the scanning gratings 4.1, 4.2 is indicated by $a_1$, the distance between the scanning gratings 4.1, 4.2 and the detection plane D by $a_2$. Reference is made to FIG. 1 for the definition of the various values. In a preferred variation of the position measuring arrangement of the invention, the ratio between the distances $a_1$ and $a_2$ should be selected in accordance with the following equation:

$$\frac{a_2}{a_1} = 2 \frac{P_{IF}}{TP_{MG}} \sqrt{\frac{1-(\lambda/TP_{MG})^2}{1-(\lambda/2P_{IF})^2}} \qquad \text{Eq. (1)}$$

The following applies here for the values used:
$a_1$=distance between the scale grating and the scanning gratings
$a_2$=distance between the scanning gratings and the detection plane
$TP_{MG}$=graduation period of the scale grating
$P_{IF}$=spatial strip pattern period in the detection plane
lambda=wavelength of the light source.

By the selection of the distance $a_1$ it is assured that at least the first and second partial beams of rays (+1), (−1), which were split at the scale grating 3, are present, spatially separated from each other, in the area of the scanning gratings 4.1, 4.2. It is furthermore assured by such a selection of the distance $a_1$ that actually only the +/−1st orders of diffraction contribute to the signal generation, from which only slightly interfered scanning signals result in turn, which in particular do not have harmonic wave portions.

A further dimensioning equation provides the size of the scanning grating graduation period $TP_{AG}$ as a function of other values. The scanning grating graduation period $TP_{AG}$ should preferably be selected in accordance with the following equation (2):

$$TP_{AG}=1/(1/TP_{MG}+\tfrac{1}{2}P_{IF}) \qquad \text{Eq. (2)}$$

Regarding the meaning of the various values, reference is made to the above Eq. (1).

In the first explained variation of the position measuring arrangement in accordance with the present invention it is provided to arrange a detector grating 5 in the detection plane D on the detector side, which causes the splitting of the light entering through the detector grating 5 into at least three different spatial directions. Furthermore, at least three optoelectronic detector elements 6.1, 6.2, 6.3 are arranged at a distance $a_3$ downstream of the detector grating 5 on the detector side, which are used for detecting, or generating, phase-shifted scanning signals $S_{0°}$, $S_{120°}$, $S_{240°}$ from the scanning of the interferential fringe pattern in the detection plane D.

The same as the other gratings used, the detector grating 5 is also embodied as a diffracting phase grating, which splits the incoming light into at least three orders of diffraction, or spatial directions. In a preferred embodiment, splitting into the zero order of diffraction, into the +/−1st orders of diffraction, as well as into the +/−2nd orders of diffraction is provided. The partial beams of rays propagated in the direction of the three detector elements 6.1, 6.2, 6.3 are identified in FIG. 1 by the recitation of the respective orders of diffraction which interfere with each other at the various gratings.

The corresponding phase grating of the detector grating 5 preferably has a bar-to-gap ratio $\eta_{MG}=1{:}2$, or $\eta_{MG}=2{:}1$, as well as a phase depth of 120° or 240°. Furthermore, the detector grating 5 has a detector grating graduation period $(TP_{DG})$ corresponding to twice the spatial interferential fringe pattern period $(P_{IF})$. Regarding the suitable design of the detector graduation 5, express reference is made to the measures disclosed in EP 0 446 691 B1, which corresponds to U.S. Pat. No. 5,430,546, the entire contents of which are incorporated herein by reference.

Because of the orders of diffraction used at the different gratings, scanning signals $S_{0°}$, $S_{120°}$, $S_{240°}$, respectively phase-shifted by 120°, result at the three detector elements 6.1, 6.2, 6.3 when there is a relative movement between the scale grating 3 and the scanning unit. These are converted in a known manner by a follow-up electronic device, not represented, into a pair of scanning signals having a first phase shift of 90°.

By this variation of the device in accordance with the present invention it is possible in particular to achieve very small structures along with a simultaneously very high degree of modulation of the scanning signals. This can be attributed to the fact that the value $a_2$ can be selected to be very small. Added to this is that the optical device of this system can be relatively easily adapted to different required grating constant and scanning distances.

A concrete embodiment of the system explained in principle by FIG. 1, which is used in particular for the detection of rotary relative movements around an axis of rotation R is shown in a schematic spatial partial representation in FIG. 3. In this representation functionally identical components have the same reference symbols as in FIG. 1.

In the case of the rotary variation, the resulting large mounting tolerance of the scale grating 3, or the so-called graduated disk, in the radial, tangential, as well as axial directions is noticeable, besides the advantages of the position measuring arrangement in accordance with the present invention already mentioned above.

A further variation of a position measuring arrangement in accordance with the invention will be described in what follows by FIGS. 4 to 6. In this connection, substantially only the important differences with respect to the first described position measuring arrangement will be discussed here.

In regard to the generation of the interferential fringe pattern in the detection plane D, which is periodically modulated in case of a relative movement, this variation corresponds to the first described variation, i.e. the periodically modulated interferential fringe pattern to be detected is generated in the detection plane D by the light source 11, the optical element 12, the scale graduation 13 and the scanning plate 14 with the scanning gratings 14.1, 14.2.

In contrast to the previous position measuring arrangement it is now provided on the detection side to place a periodic detector arrangement 16 in the detection plane, by which the periodically modulated interferential fringe pattern is detected and converted into phase-shifted scanning signals ($S_{0°}$, $S_{90°}$, $S_{180°}$, $S_{270°}$).

Figure 4:
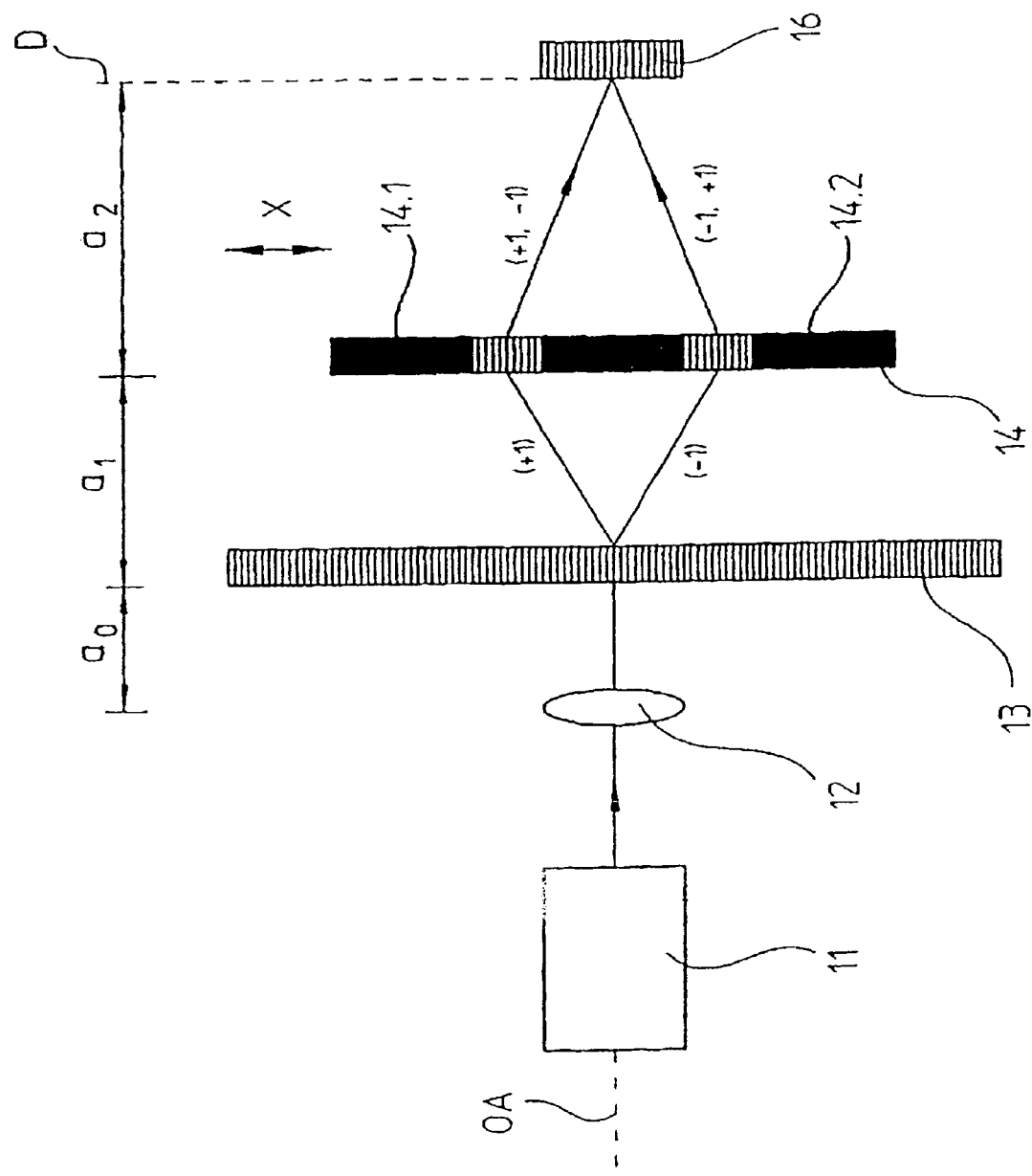
FIG. 4 is a schematic representation of the emitted beam path of second embodiment of an interferential position measuring arrangement in accordance with the present invention.
Figure 5:
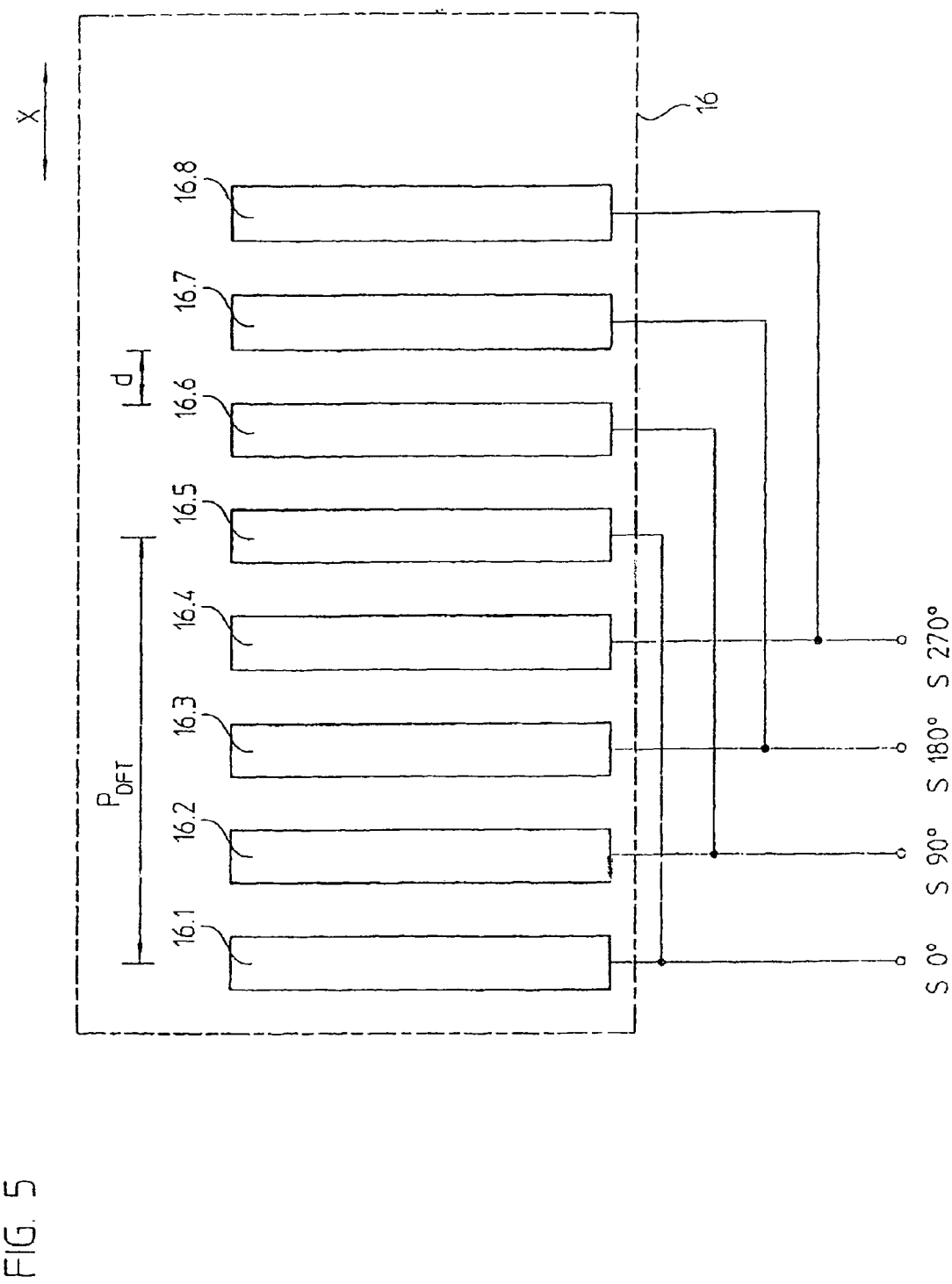
FIG. 5 is a representation of the detector arrangement of the position measuring arrangement in FIG. 4, together with the interferential fringe pattern scanned by it.

Reference is made to FIG. 5, which shows a portion of such a detector arrangement 16 in a view from above, for the detailed description of the periodic detector arrangement 16, which is only schematically indicated in FIG. 4. The periodic detector arrangement 16 includes a multitude of individual optoelectronic detector elements 16.1, 16.2, . . . , which are arranged next to each other at a defined distance d. A detector periodicity $P_{DET}$ in the direction x results from the electrically conductive connection of detector elements 16.1, 16.2, . . . , which provide identically phased scanning signals, i.e. the detector element 16.1 provides the same identically phased scanning signal $S_{0°}$ as the detector element 16.5, the detector element 16.2 provides the same identically phased scanning signal $S_{90°}$ as the detector element 16.6, etc.

For producing the desired number of phase-shifted scanning signals $S_{0°}$, $S_{90°}$, $S_{180°}$, $S_{270°}$ from the scanning of the periodically modulated interferential fringe pattern on the output side, it is necessary to match the detector period $P_{DET}$ with the spatial interferential fringe pattern period $P_{IF}$, i.e. the detector periodicity $P_{DET}$ preferably corresponds to the spatial interferential fringe pattern period $P_{IF}$. In the present exemplary embodiment it is intended to generate a total of four scanning signals $S_{0°}$, $S_{90°}$, $S_{180°}$, $S_{270°}$, each phase-shifted by 90°, at the output side. For this reason it is provided to arrange respectively four detector elements 16.1, . . . within a spatial interferential fringe pattern period $P_{IF}$ and to connect each fifth detector element, which then provides identically phased scanning signals $S_{0°}$, $S_{90°}$, $S_{180°}$, $S_{270°}$, in an electrically conductive manner.

It is of course possible for the entire detector arrangement 16 to have more than the eight detector elements 16.1, 16.2, . . . indicated in FIG. 5. In the same way it is basically possible to realize an alternative layout of the detector arrangement 16 in such a way that perhaps other phase relationships of the signals at the output side result, for example three scanning signals phase-shifted by 120°, etc.

Figure 6:
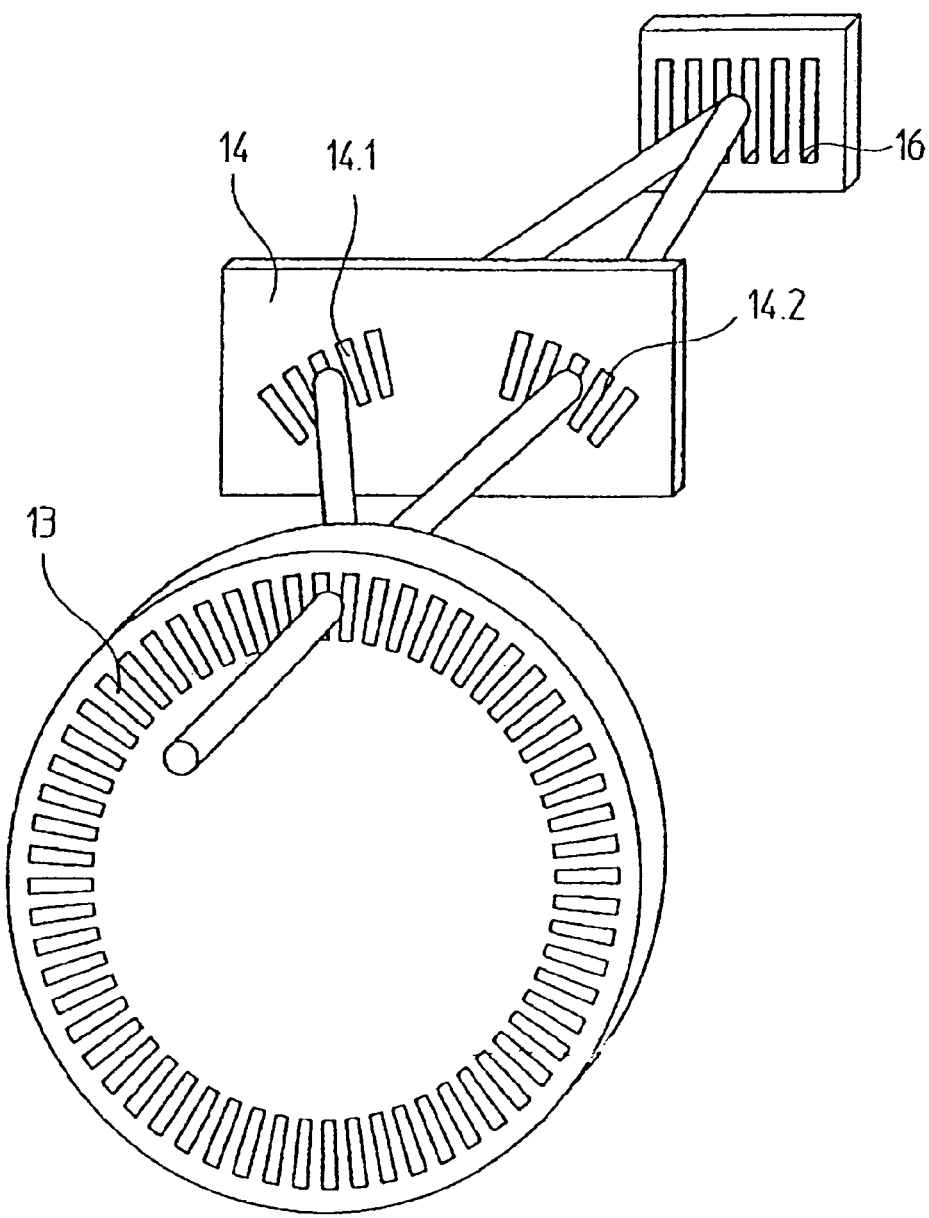
FIG. 6 is a schematic spatial partial representation of the interferential position measuring arrangement of FIG. 4 in accordance with the present invention having an emitted beam path.

Finally, in FIG. 6 a spatial partial representation of the second described variation of the position measuring arrangement in accordance with the present invention is represented in a manner analogous to the representation in FIG. 3, which is also used for detecting rotary movements around an axis of rotation R in particular. In this representation functionally identical elements have the same reference symbols as in FIG. 3.

Alternatively to the represented detection variation of the second example it would be possible, especially in the case of systems with particularly small dimensions, and the small interferential fringe pattern periods $P_{IF}$ resulting from this, not to arrange all four elements within a period $P_{IF}$, for example. Adjoining detector elements with different phase positions could be arranged alternatively also at a distance $d=P_{IF}+P_{IF}/4$, etc.

Within the scope of the present invention, still further embodiment options exist of course, besides the explained alternatives. For example, in this connection reference is made to the variation of a linear position measuring device already mentioned above, which comprises a linearly extending scale grating and correspondingly linearly-arranged scanning gratings. In case of an incident light variation, a scale grating would have to be used alternatively to the described example, which is employed by reflection, etc.

Further exemplary embodiments exist within the scope of the present invention besides the described examples.

We claim:

1. An interferential position measuring arrangement for determining the relative positions of a first object and a second object which are movable with respect to each other at least in a measuring direction, comprising:
a light source connected to a first object, which emits a beam of rays in a direction of an optical axis;
an optical element arranged downstream of said light source, which converts said beam of rays emitted by said light source into an incoming beam of rays;
a scale grating connected to a second object that moves relative to said first object and arranged downstream of said light source, which splits said incoming beam of rays at least into:
a first partial beam of rays, which is propagated into a first spatial direction;
a second partial beam of rays, which is propagated into a second spatial direction that is different from said first spatial direction;
a first scanning grating that is arranged in a beam path of said first partial beam of rays and causes splitting of said first partial beam of rays into third and fourth partial beams of rays;
a second scanning grating that is arranged in a beam path of said second partial beam of rays and causes splitting of said second partial beam of rays into fifth and sixth partial beams of rays, wherein at least two of said third, fourth, fifth and sixth partial beams of rays meet again, and wherein in the case of relative movement between said scale grating and said light source, a periodically modulated interferential fringe pattern with a definite spatial interferential fringe pattern period results in a detection plane;
a detection arrangement arranged in said detection plane, which causes splitting of light entering through said detection arrangement into at least three different spatial directions; and
optoelectronic detector elements arranged in said at least three spatial directions for detecting phase-shifted scanning signals wherein said first scanning grating and said second scanning grating are arranged together on a scanning plate, wherein said scanning plate is opaque in areas exclusive of said first and second scanning gratings so that only partial beams according to a $+1^{st}$ order of diffraction and a $-1^{st}$ order of diffraction from said scale grating contribute to generation of said scanning signals.

2. An interferential position measuring arrangement in accordance with claim 1, wherein said light source comprises a semiconductor light source.

3. An interferential position measuring arrangement in accordance with claim 1, wherein said optical element comprises a lens.

4. An interferential position measuring arrangement in accordance with claim 3, wherein said scale grating comprises a phase grating with a bar-to-gap ratio $\eta_{MG}=1:1$, as well as a phase depth $\phi_{MG}=180°$.

5. An interferential position measuring arrangement in accordance with claim 4, wherein said first scanning grating comprises a phase grating with a bar-to-gap ratio $\eta_{MG}=1:1$, as well as a phase depth $\phi_{MG}=180°$, and has a scanning grating graduation period which is less than a scale grating graduation period of said scale grating.

6. An interferential position measuring arrangement in accordance with claim 1, wherein said scale grating comprises a phase grating, and said first and second partial beams of rays correspond to +/−1st orders of diffraction, respectively.

7. An interferential position measuring arrangement in accordance with claim 1, wherein said first scanning grating comprises a phase grating, and said third and fourth partial beams of rays respectively correspond to +/−1st orders of diffraction, respectively.

8. An interferential position measuring arrangement in accordance with claim 1, wherein said first scanning grating is arranged at a distance $a_1$ from said scale grating, in which at least said first and second partial beams of rays are located spatially separated from each other.

9. An interferential position measuring arrangement in accordance with claim 1, wherein the following applies for a distance $a_1$ between said scale grating and said first scanning grating, and a distance $a_2$ between said first scanning grating and said detection plane:

$$\frac{a_2}{a_1} = 2\frac{P_{IF}}{TP_{MG}}\sqrt{\frac{1-(\lambda/TP_{MG})^2}{1-(\lambda/2P_{IF})^2}}$$

wherein
$a_1$=distance between said scale grating and said first scanning grating;
$a_2$=distance between said first scanning grating and said detection plane;
$TP_{MG}$=graduation period of said scale grating;
$P_{IF}$=spatial strip pattern period in said detection plane
$\lambda$=wavelength of said light source.

10. An interferential position measuring arrangement in accordance with claim 9, wherein the following applies for a graduation period of said scanning grating:

$TP_{AG}=1/(1/TP_{MG}\text{½}P_{IF})$, wherein
$TP_{AG}$=graduation period of said scanning grating.

11. An interferential position measuring arrangement in accordance with claim 1, wherein said scale grating is arranged in an area of beam waist of said beam of rays converted by said optical element.

12. An interferential position measuring arrangement in accordance with claim 11, wherein said incoming beam of rays define a TEM 00 mode of a Gaussian beam and at said area of beam waist a product of divergence and beam diameter of said TEM mode of said Gaussian beam is at a minimum.

13. An interferential position measuring arrangement in accordance with claim 1, wherein the detection arrangement is embodied as a phase grating, which splits incoming light at least into the zero order of diffraction, as well as into +/−2nd orders of diffraction.

14. An interferential position measuring arrangement in accordance with claim 13, wherein said detection arrangement comprises a phase grating with a bar-to-gap ratio $\eta_{MG}=1:2$, or $\eta_{MG}=2:1$, as well as a phase depth of 120° or 240°, and has a detector grating graduation period corresponding to twice said spatial interferential fringe pattern period.

15. An interferential position measuring arrangement in accordance with claim 1, wherein said first partial beam of rays corresponds to a $+1^{st}$ order of diffraction, said second partial beam of rays corresponds to said $-1^{st}$ order of diffraction, said third partial beam of rays corresponds to said $+1^{st}$ order of diffraction, said fourth partial beam of rays corresponds to said $-1^{st}$ order of diffraction, said fifth partial beam of rays corresponds to said $+1^{st}$ order of diffraction and said sixth partial beam of rays corresponds to said $-1^{st}$ order of diffraction.

16. An interferential position measuring arrangement in accordance with claim 15, wherein said detection arrangement comprises a phase grating that splits said light entering through said detection arrangement into at least a zero order of diffraction, a $+1^{st}$ order of diffraction, a $-1^{st}$ order of diffraction, a +2nd order of diffraction and a −2nd order of diffraction so that three pairs of partial beams propagate in a direction toward said optoelectronic detector elements, wherein each of said three pairs of partial beams comprises partial beams which are diffracted by said phase grating in a common direction.

17. An interferential position measuring arrangement for determining the relative positions of a first object and a second object which are movable with respect to each other at least in a measuring direction, comprising:
  a light source connected to a first object, which emits a beam of rays in a direction of an optical axis;
  an optical element arranged downstream of said light source, which converts said beam of rays emitted by said light source into an incoming beam of rays;
  a scale grating connected to a second object that moves relative to said first object and arranged downstream of said light source, which splits said incoming beam of rays at least into:
    a first partial beam of rays, which is propagated into a first spatial direction;
    a second partial beam of rays, which is propagated into a second spatial direction that is different from said first spatial direction;
  a first scanning grating that is arranged in a beam path of said first partial beam of rays and causes splitting of said first partial beam of rays into third and fourth partial beams of rays;
  a second scanning grating that is arranged in a beam path of said second partial beam of rays and causes splitting of said second partial beam of rays into fifth and sixth partial beams of rays, wherein at least two of said third, fourth, fifth and sixth partial beams of rays meet again, and wherein in the case of relative movement between said scale grating and said light source, a periodically modulated interferential fringe pattern with a definite spatial interferential fringe pattern period results in a detection plane;
  a detection arrangement arranged in said detection plane for detection of phase-shifted scanning signals, said detection arrangement comprising a plurality of individual detector elements, wherein a detection period of said individual detector elements is matched to said spatial interferential fringe pattern period, wherein said first scanning grating and said second scanning grating are arranged together on a scanning plate, wherein said scanning plate is opaque in areas exclusive of said first and second scanning gratings so that only partial beams according to a $+1^{st}$ order of diffraction and a $-1^{st}$ order of diffraction from said scale grating contribute to generation of said scanning signals.

18. An interferential position measuring arrangement in accordance with claim 17, wherein said light source comprises a semiconductor light source.

19. An interferential position measuring arrangement in accordance with claim 17, wherein said optical element comprises a lens.

20. An interferential position measuring arrangement in accordance with claim 19, wherein said scale grating comprises a phase grating with a bar-to-gap ratio $\eta_{MG}=1:1$, as well as a phase depth $\phi_{MG}=180°$.

21. An interferential position measuring arrangement in accordance with claim 20, wherein said first scanning grating comprises a phase grating with a bar-to-gap ratio $\eta_{MG}=1:1$, as well as a phase depth $\phi_{MG}=180°$, and has a scanning grating graduation period which is less than a scale grating graduation period of said scale grating.

22. An interferential position measuring arrangement in accordance with claim 17, wherein said scale grating comprises a phase grating, and said first and second partial beams of rays correspond to +/−1st orders of diffraction, respectively.

23. An interferential position measuring arrangement in accordance with claim 17, wherein said first scanning grating comprises a phase grating, and said third and fourth partial beams of rays respectively correspond to the +/−1st orders of diffraction, respectively.

24. An interferential position measuring arrangement in accordance with claim 17, wherein said first scanning grating is arranged at a distance $a_1$ from said scale grating, in which at least said first and second partial beams of rays are located spatially separated from each other.

25. An interferential position measuring arrangement in accordance with claim 17, wherein the following applies for a distance $a_1$ between said scale grating and said first scanning grating, and a distance $a_2$ between said first scanning grating and said detection plane:

$$\frac{a_2}{a_1} = 2\frac{P_{IF}}{TP_{MG}}\sqrt{\frac{1-(\lambda/TP_{MG})^2}{1-(\lambda/2P_{IF})^2}}$$

wherein
  $a_1$=distance between said scale grating and said first scanning grating;
  $a_2$=distance between said first scanning grating and said detection plane;

$TP_{MG}$=graduation period of said scale grating;
$P_{IF}$=spatial strip pattern period in said detection plane
$\lambda$=wavelength of said light source.

26. An interferential position measuring arrangement in accordance with claim 25, wherein the following applies for a graduation period of said scanning grating:

$$TP_{AG}=1/(1/TP_{MG}+\tfrac{1}{2}P_{IF}),$$

wherein
$TP_{AG}$:=graduation period of said scanning grating.

27. An interferential position measuring arrangement in accordance with claim 17, wherein said scanning grating is arranged in an area of beam waist of said beam of rays converted by said optical element.

28. An interferential position measuring arrangement in accordance with claim 27, wherein said incoming beam of rays define a TEM 00 mode of a Gaussian beam and at said area of beam waist a product of divergence and beam diameter of said TEM mode of said Gaussian beam is at a minimum.

29. An interferential position measuring arrangement in accordance with claim 17, wherein said detector period is matched to said spatial interferential fringe pattern period in such a way that adjoining ones of said plurality of individual detector elements are each provided with scanning signals which are phase-shifted by 90° with respect to each other.

30. An interferential position measuring arrangement in accordance with claim 29, wherein four of said plurality of individual detector elements are arranged within said spatial interferential fringe pattern period.

31. An interferential position measuring arrangement in accordance with claim 17, wherein said plurality of individual detector elements are connected in an electrically conducting manner which provide identically phased scanning signals.

32. An interferential position measuring arrangement in accordance with claim 17, wherein said first partial beam of rays corresponds to a $+1^{st}$ order of diffraction, said second partial beam of rays corresponds to a $-1^{st}$ order of diffraction, said third partial beam of rays corresponds to said $+1^{st}$ order of diffraction, said fourth partial beam of rays corresponds to said $-1^{st}$ order of diffraction, said fifth partial beam of rays corresponds to said $+1^{st}$ order of diffraction and said sixth partial beam of rays corresponds to said $-1^{st}$ order of diffraction.

\* \* \* \* \*

UNITED STATES PATENT AND TRADEMARK OFFICE
CERTIFICATE OF CORRECTION

PATENT NO.         : 7,154,609 B2                                              Page 1 of 1
APPLICATION NO. : 10/635422
DATED              : December 26, 2006
INVENTOR(S)        : Wolfgang Holzapfel et al.

It is certified that error appears in the above-identified patent and that said Letters Patent is hereby corrected as shown below:

On the Title Page

Item (75), replace "Völker Hofer" with --Volker Höfer--.

Item (73), before "Johannes Heidenhain" insert --Dr.--.

Signed and Sealed this

Eighteenth Day of May, 2010

David J. Kappos
*Director of the United States Patent and Trademark Office*